United States Patent [19]
Kinoshita

[11] Patent Number: 5,954,489
[45] Date of Patent: Sep. 21, 1999

[54] VANE TYPE VACUUM PUMP HAVING A PIN DRIVE COUPLING

[75] Inventor: Takashi Kinoshita, Tokyo, Japan

[73] Assignee: Mitsubishi Denki Kabushiki Kaisha, Tokyo, Japan

[21] Appl. No.: 08/794,022

[22] Filed: Feb. 3, 1997

[30] Foreign Application Priority Data

Aug. 14, 1996 [JP] Japan ..................... 8-214570

[51] Int. Cl.⁶ ................................ F04C 18/344
[52] U.S. Cl. .................. 418/179; 418/259; 418/270; 403/337
[58] Field of Search ................ 418/179, 182, 418/259, 270; 403/335, 337, 356; 464/137

[56] References Cited

U.S. PATENT DOCUMENTS

| | | | |
|---|---|---|---|
| 3,286,913 | 11/1966 | Kaatz et al. | 418/150 |
| 4,461,195 | 7/1984 | Barnick | 403/356 |
| 4,692,053 | 9/1987 | Sampedro | 403/356 |
| 4,697,995 | 10/1987 | Tuckey | 418/15 |
| 4,815,953 | 3/1989 | Lio | 418/179 |
| 5,156,532 | 10/1992 | Arndt et al. | 417/360 |

FOREIGN PATENT DOCUMENTS

| | | | |
|---|---|---|---|
| 698496 | 11/1930 | France | 418/270 |
| 2 249 251 | 10/1973 | France . | |
| 2354039 | 5/1975 | Germany | 418/270 |
| 64-8383 | 1/1989 | Japan | 418/179 |
| 2-218885 | 8/1990 | Japan . | |
| 3-1294 | 1/1991 | Japan . | |
| 612986 | 11/1948 | United Kingdom | 418/270 |

*Primary Examiner*—John J. Vrablik
*Attorney, Agent, or Firm*—Sughrue, Mion, Zinn, Macpeak & Seas, PLLC

[57] ABSTRACT

In a vane type vacuum pump comprising a rotor 5 having a rotary shaft offset in a pump chamber P of hermetically sealed structure, grooves 5a disposed on the outer periphery of the rotor, vanes 6 disposed in the grooves and sliding while in intimate contact with the inner wall of the pump chamber, an input shaft 1 having a rotary shaft coaxial with the rotor, and torque transmission means for transmitting the rotational torque of the input shaft to the rotor, the torque transmission means includes a carrier 7 disposed to the outer periphery of the input shaft integrally therewith, a flange unit 7a formed to the end surface of the carrier so as to confront the end surface of the rotor, recessed portions 5b, 7b formed to the respective end surfaces of the rotor and the flange unit, and pins 8 for coupling the rotor with the flange unit through the respective recessed portions, and the pins extending in the direction of the rotary shafts of the rotor and the input shaft are inserted into the respective recessed portions. With this arrangement, the vane type pump chamber can enhance a volume efficiency and realize miniaturization and reduction of weight.

14 Claims, 10 Drawing Sheets

VANE TYPE VACUUM PUMP HAVING A PIN DRIVE COUPLING

BACKGROUND OF THE INVENTION

1. Field of the Invention

The present invention relates to a vane type vacuum pump to be mounted on diesel engine automobiles and the like, and more specifically, to a vane type vacuum pump which enhances a volume efficiency as well as realizes miniaturization and reduction of weight by improving the coupling structure of an input shaft with a rotor.

2. Description of the Related Art

In general, although automobile brakes use a negative pressure to obtain an auxiliary force, since diesel engine automobiles cannot obtain the negative pressure directly from an engine, they obtain the negative pressure by driving a vacuum pump by the rotational torque of the engine.

FIG. 10 is a side cross sectional view showing a vane type vacuum pump employing a conventional gear drive system and FIG. 11 is a cross sectional view taken along the line D—D of FIG. 10.

In the respective drawings, the input shaft 1 of the vane type vacuum pump has a gear 1a securely fixed to the outer periphery of one end thereof projecting to the outside by force-fit (or shrinkage-fit) and the vacuum pump is driven in rotation by an engine side drive gear (not shown) engaged with the gear 1a.

The end of the input shaft 1 on the gear 1a side is journaled on a bearing 2a disposed to a front bracket 2 and the other end of the input shaft 1 is journaled on a sleeve bearing 3a disposed to a rear bracket 3. The front bracket 2 and the rear bracket 3 are composed of aluminum alloy for the reduction of weight thereof.

The front bracket 2 and the rear bracket 3 constitute a cylindrical pump chamber P which is hermetically sealed through an O ring 4 and the central axis of the pump chamber P is offset from the center of rotation of the input shaft 1.

In this case, the rear bracket 3 has a housing shape for constituting the pump chamber P and is securely fixed to the front bracket 2 by three bolts Q (see FIG. 11.)

A spline-coupling portion 1b is formed to the middle of the input shaft 1 in the pump chamber P and a rotor 5 is engaged with the input shaft 1 through the spline-coupling portion 1b. A similar spline-coupling portion is also formed to the inner periphery of the rotor 5 so that it is coupled with the spline-coupling portion 1b.

The rotor 5 is held unmovable in a rotational direction and movable in an axial direction by being spline coupled to the input shaft 1.

The input shaft 1 and the rotor 5 are composed of alloy steel or a sintered iron (Fe) material to secure strength at the spline-coupling portion.

A plurality of grooves 5a (three in the case of FIG. 11) are formed to the outer periphery of the rotor 5 and vanes 6 are accommodated in the respective grooves 5a so as to be radially movable.

As shown in FIG. 11, one end of the rotor 5 comes into intimate contact with the inner wall of the rear bracket 3 through an oil film of several microns thick and the vanes 6 are completely accommodated in the grooves 5a at the position. Further, a space is formed by offset between each the grooves 5a and the inner wall of the rear bracket 3 so that the vane 6 can sufficiently fly out from the groove 5a.

A lubrication passage 3b and a suction port 3c are formed to the rear bracket 3 and an exhaust port 2b communicating with the lubrication passage 3b is formed to the front bracket 2. A lubricant supplied from the lubrication passage 3b acts to seal the pump chamber P as well as cool the vacuum pump and is exhausted from the exhaust port 2b passing through the sleeve bearing 3a and the spline-coupling portion 1b.

A tank (not shown) which is required to be evacuated to vacuum is connected to the suction port 3c and air sucked from the suction port 3c (see an arrow) is exhausted from the exhaust port 2b disposed at a confronting position.

Next, operation of the conventional vane type vacuum pump shown in FIG. 10 and FIG. 11 will be described.

First, the input shaft 1 journaled on the bearing 2a and the sleeve bearing 3a is driven in rotation through the gear 1a engaged with the engine side drive gear.

The rotational torque of the input shaft 1 is transmitted to the rotor 5 through the spline-coupling portion 1b and rotates the vanes 6 disposed in the outer peripheral grooves 5a of the rotor 5 clockwise in FIG. 11.

With this operation, the vanes 6 are flown out radially from the grooves 5a by a centrifugal force and rotated while being pressed against the inner wall of the rear bracket 3 of the pump chamber P under pressure as well as sliding through the oil film.

At the time, since the center of rotation of the rotor 5 is offset from the central axis of the pump chamber P, air is sucked from the suction port 3c side and sequentially exhausted from the exhaust port 2b side as the vanes 6 are rotated to thereby make the tank connected to the suction port 3c to a negative pressure.

Incidentally, the volume efficiency of the vacuum pump depends upon the amount of offset of the center of rotation the rotor 5 with respect to the pump chamber P (the amount of flying out of the vanes 6), that is, the depth of the outer peripheral grooves 5a of the rotor 5. However, since the depth of the grooves 5a is regulated by the outside diameter of the spline-coupling portion 1b and further the outside diameter of the spline-coupling portion 1b cannot be reduced to secure mechanical strength, it is difficult to set the volume efficiency depending upon the pump chamber P and the vanes 6 to a large value.

Since the rotor 5 which is engaged through the spline-coupling portion 1b in the vicinity of the center of the input shaft 1 is composed of the sintered Fe material to secure the mechanical strength such as wear resistance and the like taking transmission torque into consideration, it is difficult to reduce the weight thereof.

Further, since the coefficient of thermal expansion of the rotor 5 composed of the sintered Fe material is different from that of the front bracket 2 and the rear bracket 3 composed of the aluminum alloy, it is difficult to secure gastightness in the pump chamber P of high temperature, thus sufficient vacuum characteristics cannot be obtained at high temperature.

As described above, the conventional vane type vacuum pump transmits the rotational torque of the input shaft 1 to the rotor 5 by the engagement of the spline-coupling portion 1b formed to the outer periphery of the input shaft 1 with the spline-coupling portion formed to the inner periphery of the rotor 5. Thus, there is a problem that the volume efficiency cannot be sufficiently secured by the vanes 6 in the pump chamber P because the depth of the grooves 5a are regulated.

Since the rotor 5 which is rotated through the spline-coupling portion 1b is composed of the sintered Fe material, there is a problem that the weight of the rotor 5 cannot be reduced.

Further, since the coefficient of thermal expansion of the rotor 5 (sintered Fe material) is different from that of the front bracket 2 and the rear bracket 3 (aluminum alloy), there is a problem that it is very difficult to secure gastightness between the rotor 5 and the pump chamber P in a temperature range to be used.

An object of the present invention made to solve the above problems is to provide a vane type vacuum pump which enhances a volume efficiency as well as realizes miniaturization and reduction of weight.

Another object of the present invention is to provide a vane type vacuum pump which realizes reduction of weight as well as secures stable gastightness in a wide temperature range by composing a rotor of aluminum alloy.

SUMMARY OF THE INVENTION

A vane type vacuum pump according to the present invention comprises a cylindrical pump chamber of hermetically sealed structure having a suction port and an exhaust port, a rotor disposed in the pump chamber and having a rotary shaft offset with respect to a central axis of the pump chamber, a plurality of grooves disposed to the outer periphery of the rotor, vanes radially movably disposed in the grooves and sliding in intimate contact with the inner wall of the pump chamber when the rotor rotates, an input shaft having a rotary shaft coaxial with the rotor for rotating the rotor, and torque transmission means for transmitting the rotational torque of the input shaft to the rotor, wherein the torque transmission means comprises a carrier disposed to the outer periphery of the input shaft integrally therewith, a flange unit formed to the end surface of the carrier so as to confront the end surface of the rotor, a plurality of recessed portions formed to the respective end surfaces of the rotor and the flange unit, and a plurality of pins for coupling the rotor with the flange unit through the respective recessed portions with the respective pins extending in the direction of the rotary shafts of the rotor and the input shaft and inserted into the respective recessed portions.

A vane type vacuum pump according to the present invention is arranged such that the respective pins are disposed concentrically with the center of rotation of the rotor and the input shaft.

A vane type vacuum pump according to the present invention is arranged such that the respective pins are securely fixed to the recessed portions on the end surface of the rotor by force-fit or shrinkage-fit as well as axially movably held by the recessed portions on the end surface of the flange unit.

A vane type vacuum pump according to the present invention is arranged such that the recessed portions on the end surface of the flange unit extends in a radial direction and is formed to a U-shape on a plane.

A vane type vacuum pump according to the present invention is arranged such that the recessed portions on the end surface of the flange unit have an inside diameter slightly larger than the outside diameter of the pins and are formed to a circular shape on a plane.

A vane type vacuum pump according to the present invention is arranged such that the respective pins are securely fixed to the recessed portions on the end surface of the flange unit by force-fit or shrinkage-fit as well as axially movably held by the recessed portions on the end surface of the rotor.

A vane type vacuum pump according to the present invention is arranged such that the recessed portions on the end surface of the rotor have an inside diameter slightly larger than the outside diameter of the pins and are formed to a circular shape on a plane.

A vane type vacuum pump according to the present invention is arranged such that the carrier is securely fixed to the input shaft by force-fit or shrinkage-fit.

A vane type vacuum pump according to the present invention is arranged such that the carrier is formed to the outer periphery of the input shaft integrally therewith.

A vane type vacuum pump according to the present invention is arranged such that the rotor has a through hole with an inside diameter slightly larger than the outside diameter of the input shaft and the input shaft is inserted into the through hole and journals the rotor so that it is movable in the direction of the rotary shaft thereof.

A vane type vacuum pump according to the present invention is arranged such that the rotor has a through hole with an inside diameter slightly smaller than the outside diameter of the input shaft and the input shaft supports the rotor by being force fit into the through hole.

A vane type vacuum pump according to the present invention is arranged such that the pump chamber is composed of a front bracket and a rear bracket each composed of aluminum alloy and the rotor is composed of aluminum alloy.

A vane type vacuum pump according to the present invention is arranged such that the rear bracket has an opening and one end of the input shaft is journaled by the opening.

A vane type vacuum pump according to the present invention is arranged such that the input shaft is journaled through the outer periphery of the carrier.

DESCRIPTION OF THE PREFERRED EMBODIMENTS

Embodiment 1

Figure 1:
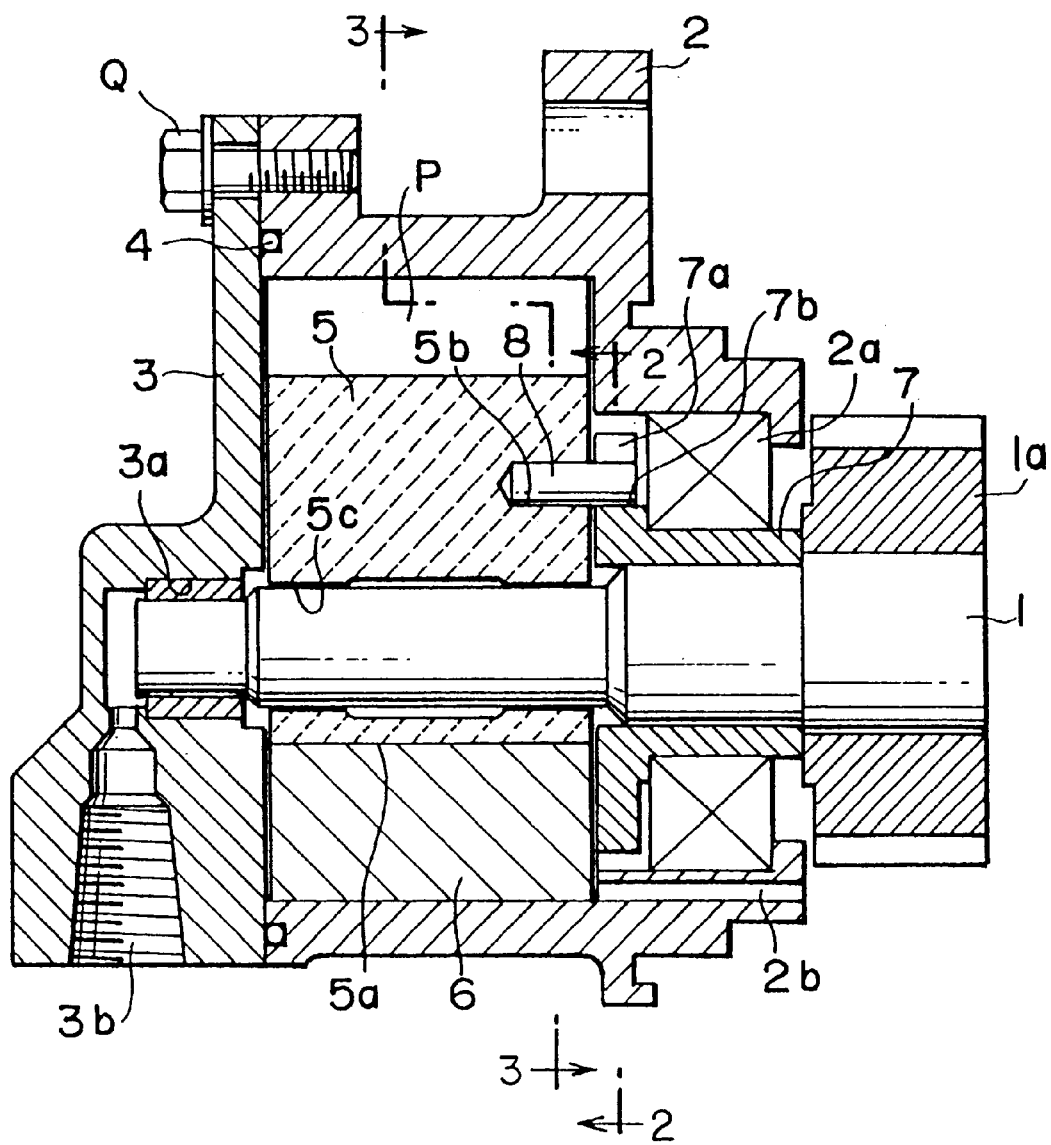
FIG. 1 is a side cross sectional view showing an embodiment 1 of the present invention.
Figure 2:
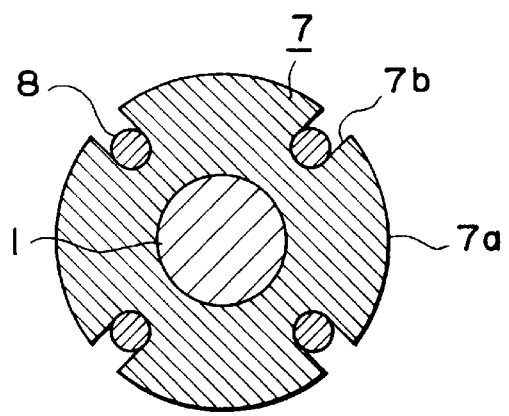
FIG. 2 is a cross sectional view taken along the line A—A of FIG. 1.
Figure 3:
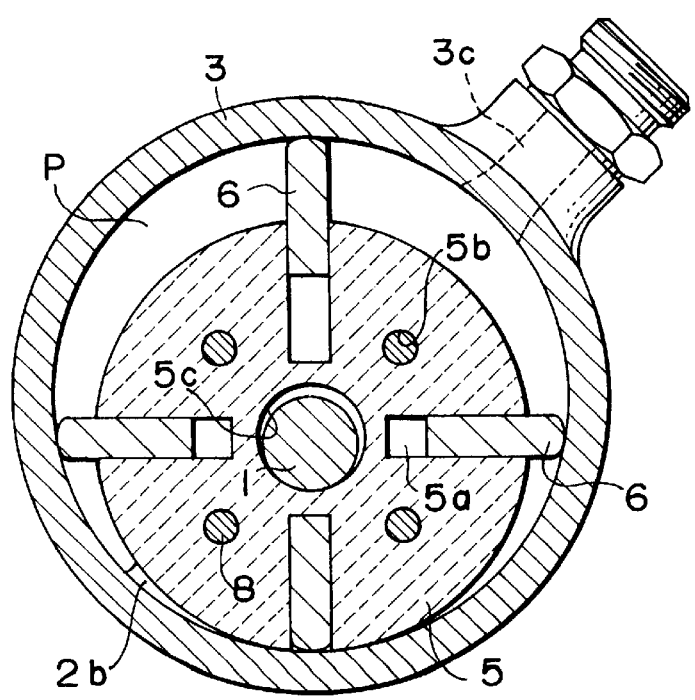
FIG. 3 is a cross sectional view taken along the line B—B of FIG. 1.

An embodiment 1 of the present invention will be described below with reference to the drawings. FIG. 1 is a side cross sectional view showing an embodiment 1 of the present invention, FIG. 2 is a cross sectional view taken along the line A—A of FIG. 1 and FIG. 3 is a cross sectional view taken along the line B—B of FIG. 1. Arrangements similar to those mentioned above are denoted by the same numerals and the description thereof is omitted.

In this case, torque transmission means for transmitting the rotational torque of an input shaft 1 to a rotor 5 includes a carrier 7 disposed to the outer periphery of the input shaft 1 integrally therewith, a flange unit 7a formed to the end surface of the carrier 7 in confrontation with the end surface of the rotor 5, a plurality of recessed portions 5b and 7b formed to the respective end surfaces of the rotor 5 and the flange unit 7a and a plurality of pins 8 for coupling the rotor 5 and the flange unit 7a through the respective recessed portions 5b, 7b in place of the aforesaid spline-coupling portion 1b.

The respective pins 8 extends in the rotational axis direction of the rotor 5 and the input shaft 1 and are inserted into the respective recessed portions 5b and 7b. Further, the respective pins 8 are disposed concentrically with the center of rotation of the rotor 5 and the input shaft 1 and located on the outer peripheral side of the rotor 5.

The respective pins 8 are securely fixed to the recessed portions 5b on the end surface of the rotor 5 by force-fit or shrinkage-fit as well as held by the recessed portions 7b on the end surface of the flange unit 7a so as to be movable in an axial direction.

Further, the recessed portions 7b on the flange unit 7a are formed by being extended in a radial direction and have a U-shape on a plane as shown in FIG. 2.

The carrier 7 is securely fixed to the input shaft 1 integrally therewith by force-fit or shrinkage-fit.

The rotor 5 has a through hole 5c whose inside diameter is slightly larger than the outside diameter of the input shaft 1 and the input shaft 1 is inserted into the through hole 5c and journals the rotor 5 so that it is movable in the rotational axis direction.

The bearing 2a in a front bracket 2 journals the outer periphery of the carrier 7 and one end of the input shaft 1 on the gear 1 side is journaled through the carrier 7.

Further, the rotor 5 is composed of aluminum alloy which is the same material as that of the front bracket 2 and the rear bracket 3 (aluminum alloy) constituting the pump chamber P.

In this case, the front bracket 2 has a housing shape for constituting the pump chamber P and is securely fixed by bolts Q on the rear bracket 3 side through an O ring 4.

With this arrangement, the thickness of the front bracket 2 is reduced on the bearing 2a side to thereby realize miniaturization.

Next, operation of the embodiment 1 of the present invention shown in FIG. 1 to FIG. 3 will be described. Note, as apparent from the positional relationship between a suction port 3c and an exhaust port 2b (see FIG. 3), FIG. 1 to FIG. 3 show a case that the input shaft 1 and the rotor 5 rotate counterclockwise.

First, the recessed portions 5b having an inside diameter slightly smaller than the outside diameter of the pins 8 are formed to the end surface of the rotor 5 when the rotor 5 is made and the plurality of pins 8 are securely fixed in the recessed portions 5b concentrically with the center of the rotation of the rotor 5 by force-fitting (or shrinkage-fitting).

The carrier 7 having the flange unit 7a is securely fixed on the input shaft 1 by force-fitting (or shrinkage-fitting) as well as the recessed portions 7b having an inside diameter greater than the outside diameter of the pins 8 disposed on the recessed portion 7b in correspondence to the pins 8 on the rotor 5.

Then, the rotational torque of the input shaft 1 is transmitted to the rotor 5 through the pins 8 by inserting the pins 8 disposed on the rotor 5 into the recessed portions 7b on the flange unit 7a as shown in FIG. 1 and FIG. 2.

On the other hand, the through hole 5c which has the diameter permitting the input shaft 1 to pass therethrough is defined to the center of the of the rotor 5, the input shaft 1 is inserted into the through hole 5c while leaving a gap therebetween and the rotor 5 is journaled therein so that it can slide in the axial direction.

The rotor 5 is coupled with the input shaft 1 through the carrier 7 and the pins 8 which act as the torque transmission means and driven in rotation together with the input shaft 1.

Therefore, the rotational torque transmitted from an external engine (not shown) to the input shaft 1 through the gear 1a is transmitted to the carrier 7 arranged integrally with the input shaft 1 and to the rotor 5 from the pins 8 inserted into the recessed portions 7b on the flange unit 7a of the carrier 7 to thereby rotate the rotor 5 and vanes 6 about the input shaft 1.

Figure 10:
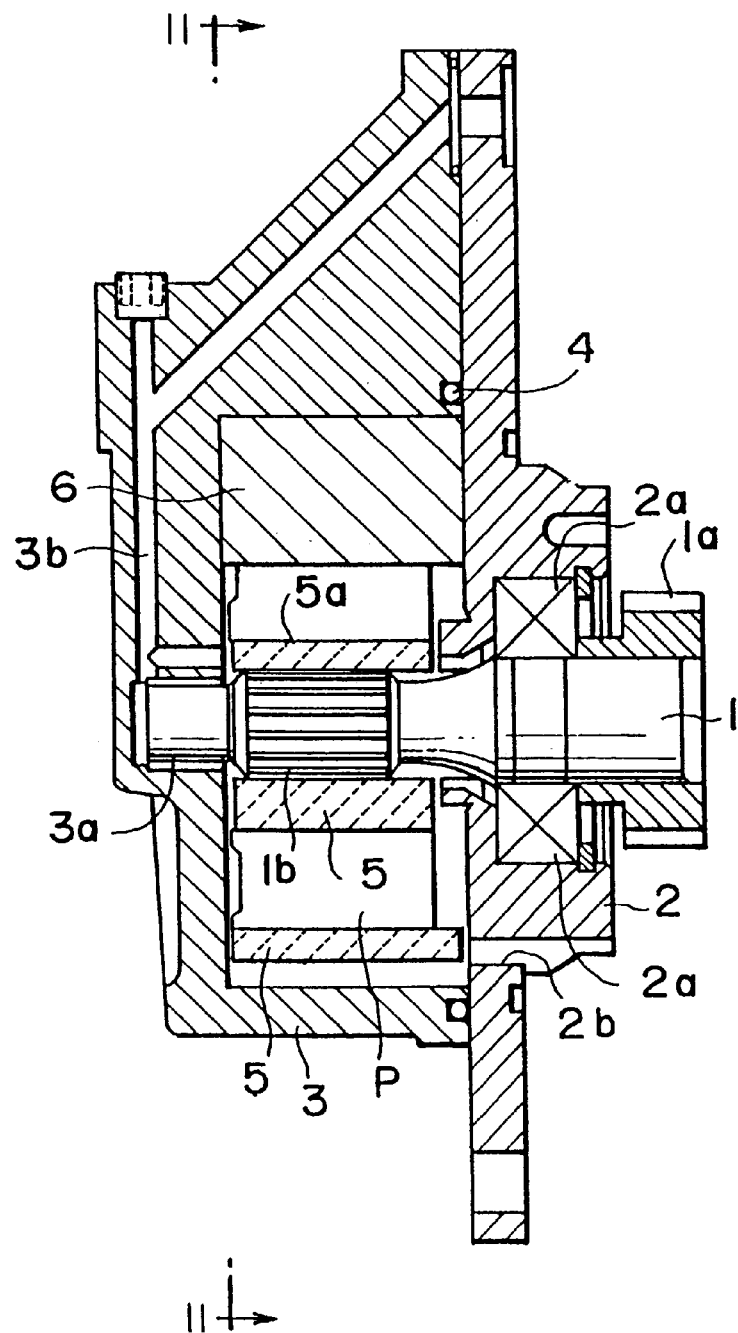
FIG. 10 is a side cross sectional view showing a conventional vane type vacuum pump.
Figure 11:
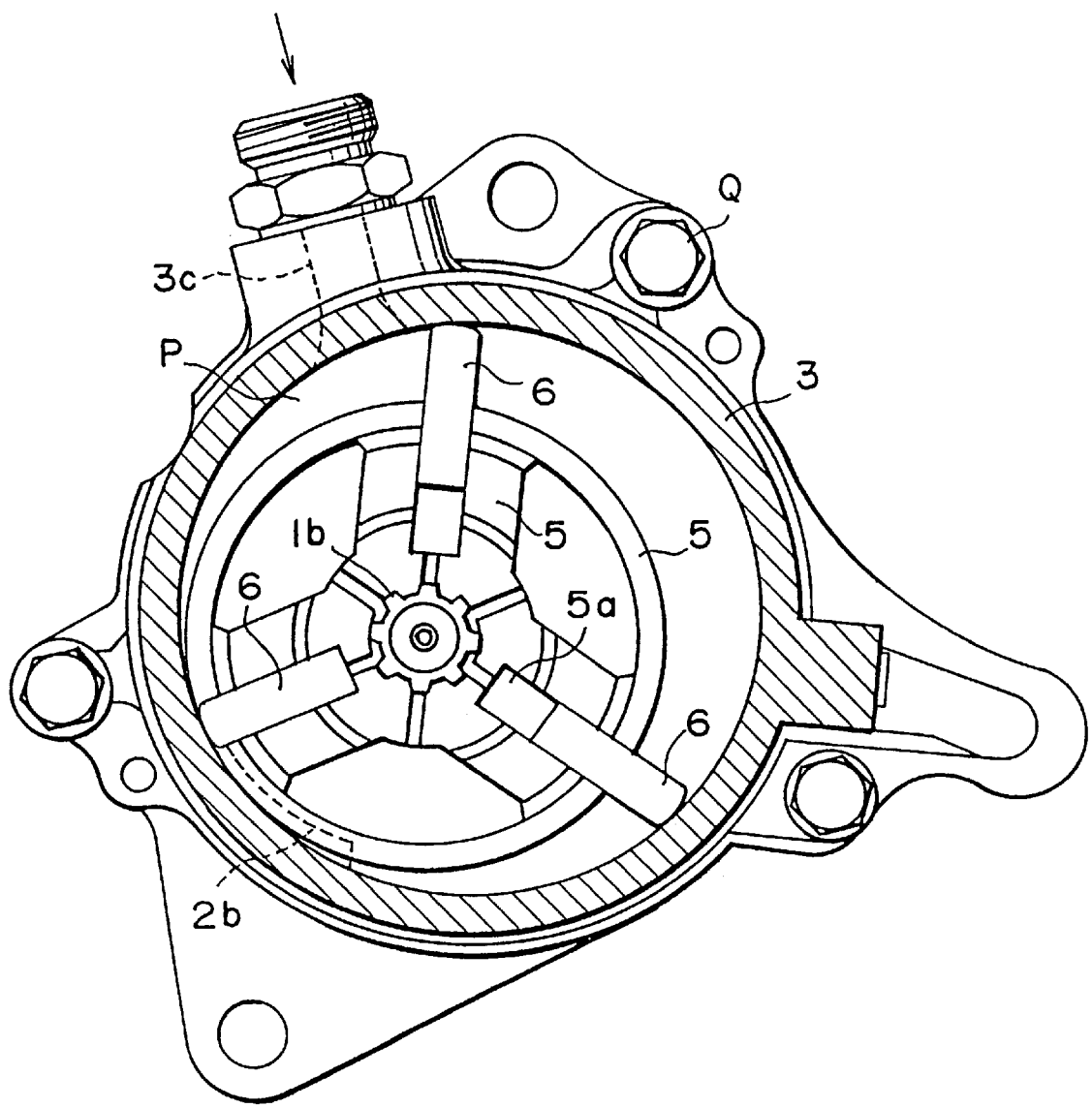
FIG. 11 is a cross sectional view taken along line D—D of the vacuum pump shown in FIG.
Figure 12:
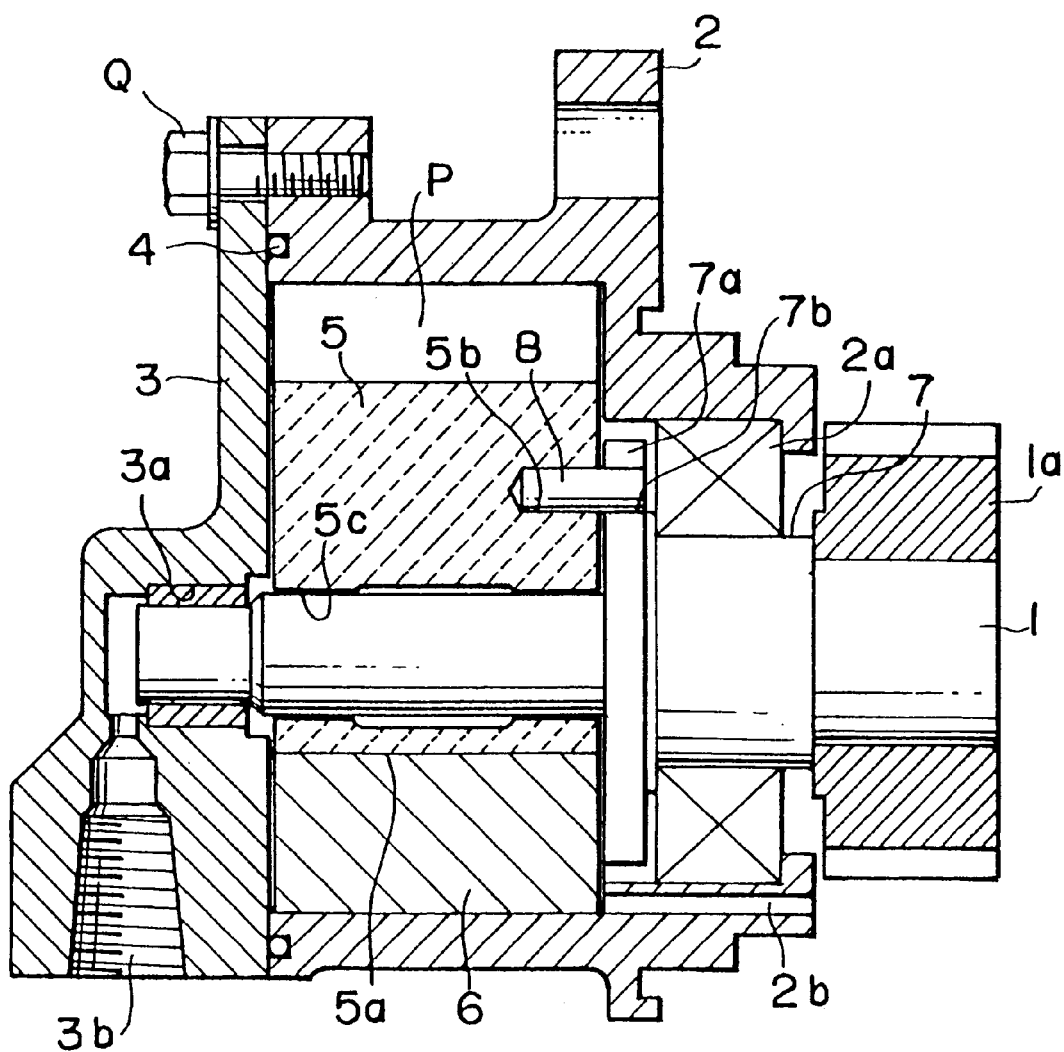
FIG. 12 is a side cross sectional view showing an aspect of the invention where an input shaft and a carrier are formed as a unit.

Since the spline-coupling portion 1b (see FIG. 10) used as the torque transmission means for transmitting the rotational torque from the input shaft 1 to the rotor 5 is replaced with the pins 8 as described above, the torque transmission means can be disposed at a position apart from the center of rotation of the input shaft 1 in an outer peripheral direction.

A tangential force imposed on the pins 8 can be reduced by increasing the radius of transmission of the rotational torque as described above, whereby the rotor 5 can be composed of the aluminum alloy to realize reduction of weight.

Since the spline-coupling portion 1b is not necessary, the inside diameter of the rotor 5 can be reduced and the grooves 5a used for inserting the vanes 6 into the rotor 5 can be formed deeply in the direction of the center axis of rotation. Therefore, the amount of flying-out of the vanes 6 can be set to a large value, whereby the volume efficiency can be enhanced. Further, the coaxial accuracy between the input shaft 1 and the rotor 5 is enhanced as compared with the case in which the spline-coupling portion 1b is used, whereby a vacuum accuracy is enhanced.

In addition, since the adverse affect caused by the difference of coefficients of thermal expansion can be avoided by composing the rotor 5, the front bracket 2 and the rear bracket 3 of the same material by composing the rotor 5 of the aluminum alloy, a specification of characteristics to a change of temperature is stabilized so that the coaxial accuracy between the rotor 5 and the input shaft 1 is enhanced, whereby the accuracy of the vacuum pump can be enhanced.

Since the pins 8 constituting the torque transmission means are supported in the recessed portions 7b formed to the U-shape on the plane only in a rotational direction, they have flexibility in the axial direction and the radial direction, so that structural restriction is reduced as well as an assembling property can be enhanced. In addition, the formation of the recessed portions 7b to the U-shape permits the weight of the flange unit 7a of the carrier 7 to be reduced to thereby accelerate the weight reduction.

Note, although the pins 8 are disposed concentrically with the center of rotation of the input shaft 1 in the embodiment 1, it is needless to say that the pins 8 may be disposed at any arbitrary position where the end surface of the rotor 5 confronts the end surface of the flange unit 7a.

Further, although the rotor 5 is composed of the aluminum alloy, it may be composed of any arbitrary material having a coefficient of thermal expansion similar to that of the aluminum alloy. When the front bracket 2 and the rear bracket 3 are composed of other material, it suffices only to compose the rotor 5 of the other material likewise.

Although the bearing 2a is disposed to the outer periphery of the carrier 7 for the purpose of miniaturization in the axial direction, when the miniaturization is not particularly needed, the bearing 2a may be moved in the axial direction of the input shaft 1 and journal the input shaft 1 at any arbitrary position.

Further, although the rear bracket 3 side is formed to the housing shape for the purpose of the miniaturization in the axial direction, when the miniaturization is not particularly needed, the front bracket 2 side may be formed to the housing shape likewise the above-mentioned.

Embodiment 2

Although the recessed portions 7b for supporting the pins 8 in the rotational direction are formed to the U-shape on the plane in the embodiment 1, they may be formed to a circular shape.

Figure 4:
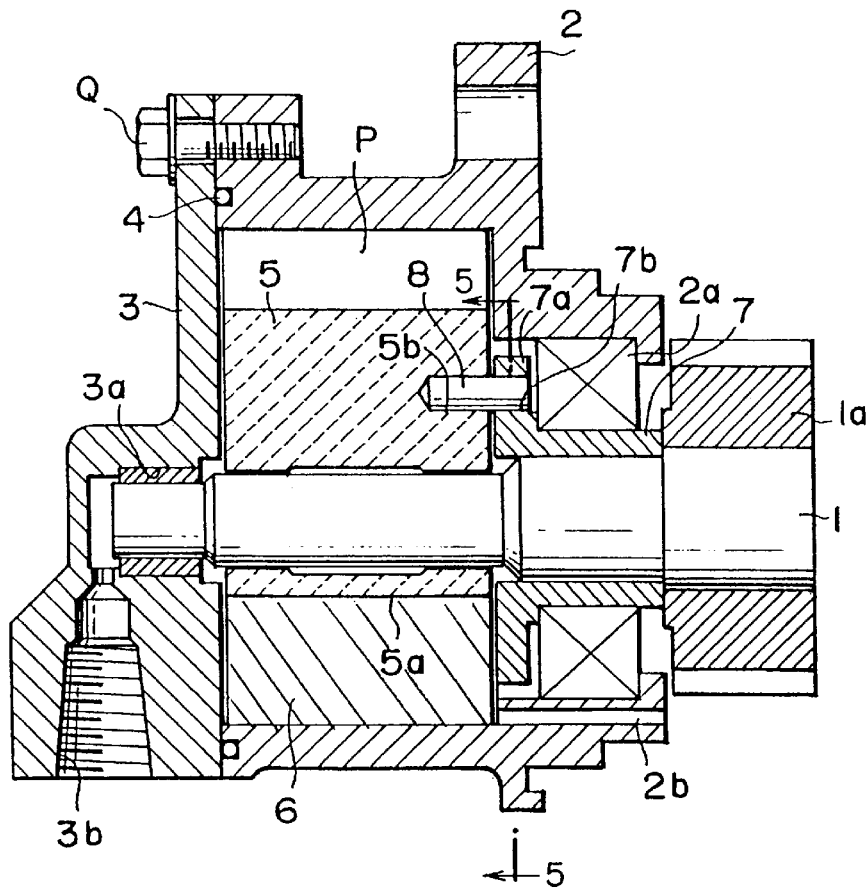
FIG. 4 is a side cross sectional view showing an embodiment 2 of the present invention.
Figure 5:
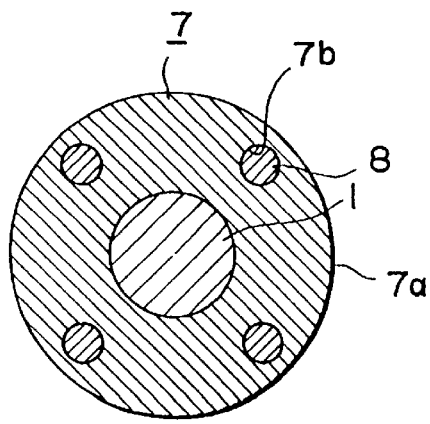
FIG. 5 is a cross sectional view taken along the line C—C of FIG. 4.

FIG. 4 is a side cross sectional view showing an embodiment 2 of the present invention in which the recessed portions 7b are formed to a circular shape and FIG. 5 is a cross sectional view taken along the line C—C of FIG. 4, wherein arrangements similar to those mentioned above are denoted by the same numerals and the description thereof is omitted.

In this case, the circular recessed portions 7b formed to the flange unit 7a have an inside diameter slightly larger than the outside diameter of the pins 8 and support the pins 8 so that they are movable in an axial direction.

With this arrangement, the rotational torque of the input shaft 1 can be transmitted to the rotor 5 through the pins 8 likewise the above arrangement, although structural flexibility and assembling property are slightly restricted.

Embodiment 3

Although the pins 8 are securely fixed to the recessed portions 5b on the rotor 5 side, they may be securely fixed to the recessed portions 7b on the carrier 7 side. In this case, the respective pins 8 are securely fixed to the recessed portions 7b on the flange unit 7a by force-fit or shrinkage-fit as well as they are axially movably held by the recessed portions 5b on the rotor 5.

Note, the recessed portions 5b on the rotor 5 may be formed to a circular shape on a plane likewise the above arrangement.

Embodiment 4

Although the carrier 7 is securely fixed to the outer periphery of the input shaft 1 by force-fit (or shrinkage-fit), the carrier 7 may be formed integrally with the input shaft 1 on the outer periphery thereof in the process for manufacturing the input shaft 1.

In this case, since the number of parts can be reduced, a cost can be further lowered.

Embodiment 5

Figure 13:
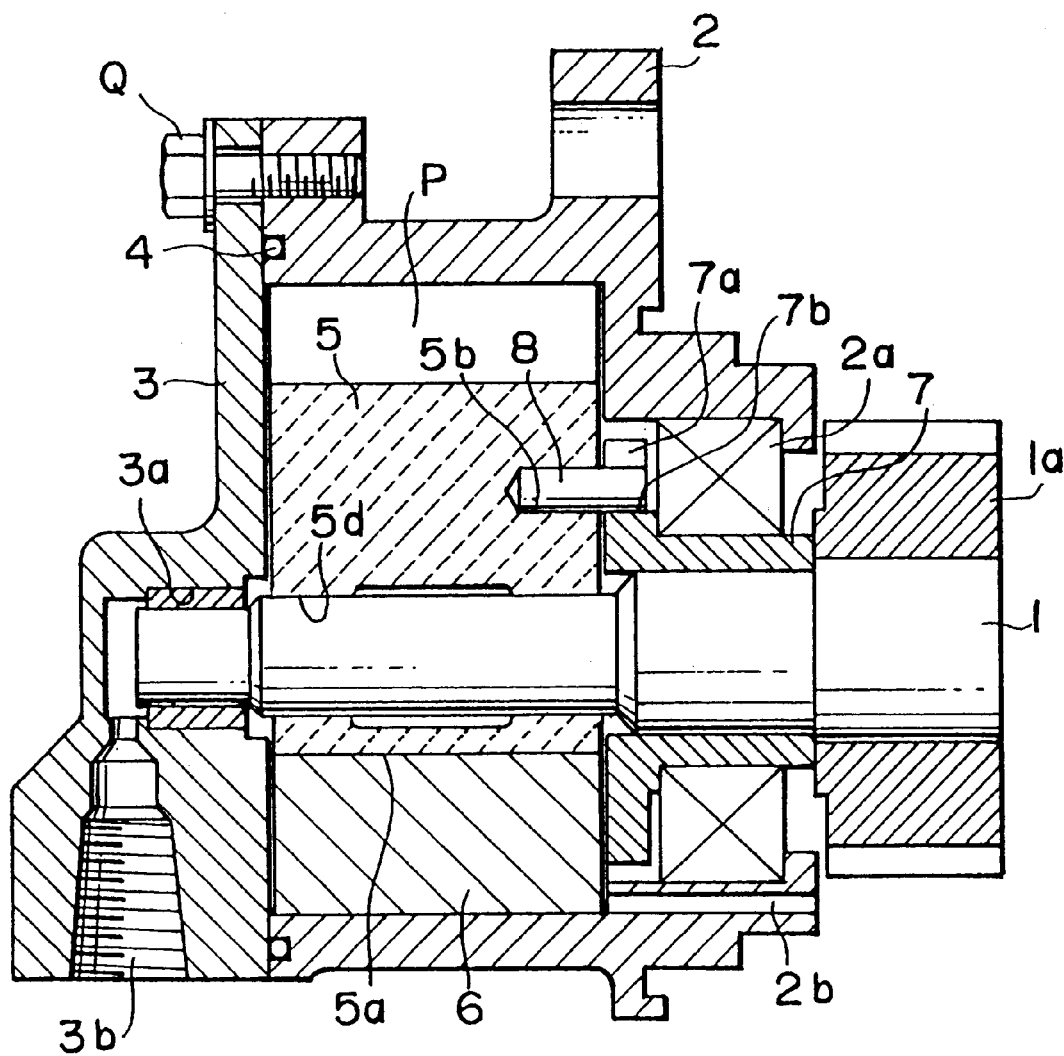
FIG. 13 is a side cross sectional view showing an aspect of the invention where there is no gap between the input shaft and the rotor.

Although the input shaft 1 is inserted into the large through hole 5c defined to the rotor 5 and the rotor 5 is journaled on the input shaft 1 so as to be movable in the axial direction, the inside diameter of the through hole 5c may be formed slightly smaller than the outside diameter of the input shaft 1 and the input shaft 1 may be inserted into the small through hole 5d by force-fit, as shown in FIG. 13

In this case, since the input shaft 1 force fit into the through hole 5d supports the rotor 5 also in the rotational direction, the tangential force imposed on the pins 8 can be further reduced, whereby the strength of the rotor 5 can be reduced.

Embodiment 6

Although the extreme end of the input shaft 1 is journaled by the sleeve bearing 3a provided with the rear bracket 3 in the above respective embodiments, when the rear bracket 3 is composed of the aluminum alloy, the input shaft 1 may be directly journaled at the opening of the rear bracket 3.

Figure 6:
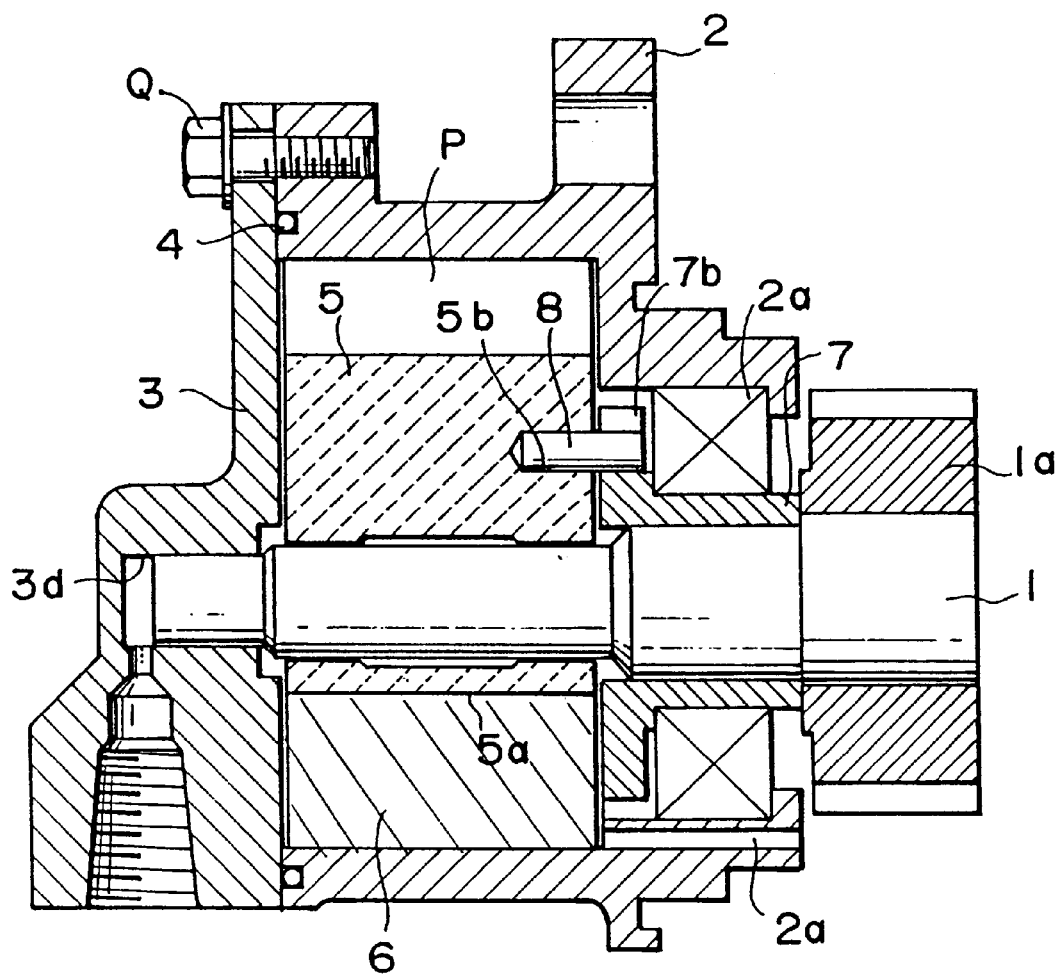
FIG. 6 is a side cross sectional view showing an embodiment 6 of the present invention.

FIG. 6 is a side cross sectional view showing an embodiment 6 of the present invention in which the input shaft 1 is directly journaled by the rear bracket 3, wherein the arrangements similar to those mentioned above are denoted by the same numerals and the description thereof is omitted.

In this case, since an opening 3d is formed to the rear bracket 3 and the extreme end of the input shaft 1 is directly journaled by the opening 3d, the metal sleeve bearing 3a (see FIG. 1) can be omitted.

With this arrangement, the weight can be further reduced as well as since the bearing unit is composed of the aluminum alloy likewise the rear bracket 3, the structural accuracy to the change of temperature can be further stabilized.

Note, over-crystallized aluminum alloy containing silicon (Si) monocrystal and the like are used as the aluminum alloy functioning as the bearing.

Embodiment 7

Although the gear 1a is disposed to the one end of the input shaft 1 on the front side as the engaging unit for the drive source on the external engine side in the above respective embodiments, it is needless to say that any arbitrary engaging unit may be used.

Figure 7:
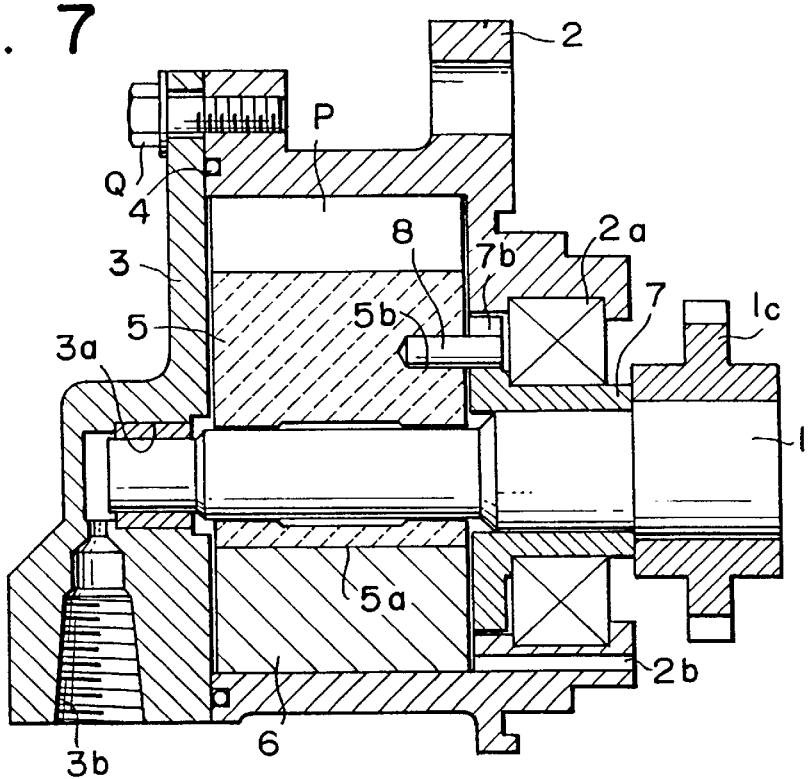
FIG. 7 is a side cross sectional view showing an embodiment 7 of the present invention.

FIG. 7 is a side cross sectional view showing an embodiment 7 of the present invention in which a sprocket 1c is applied as the engaging unit for the engine side drive source (not shown), wherein arrangements similar to those mentioned above are denoted by the same numerals and the description thereof is omitted.

In this case, the sprocket 1c is securely fixed to a chain drive input shaft 1 integrally therewith on one side thereof on a front side and the input shaft 1 is coupled with the engine side drive source through a chain engaged with the sprocket 1c.

Embodiment 8

Figure 8:
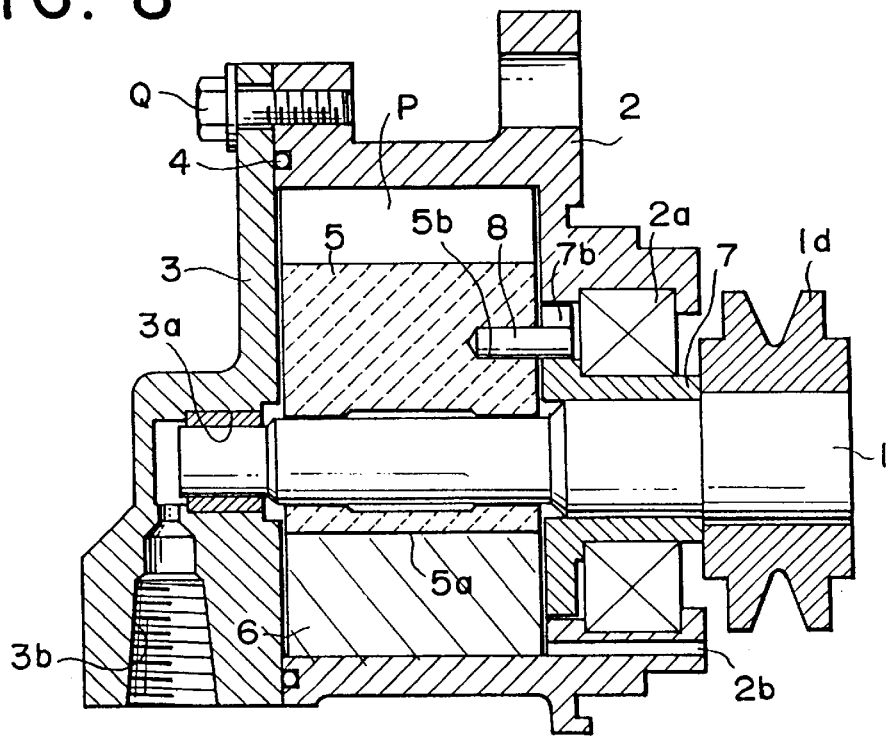
FIG. 8 is a side cross sectional view showing an embodiment 8 of the present invention.

FIG. 8 is a side cross sectional view showing an embodiment 8 of the present invention in which a V-pulley 1d is applied as the engaging unit with the engine side drive source, wherein arrangements similar to those mentioned above are denoted by the same numerals and the description thereof is omitted.

In this case, the V-pulley 1d is securely fixed to a pulley-drive type input shaft 1 integrally therewith on one side thereof on the front side and the input shaft 1 is coupled with the engine side drive source through a belt (not shown) trained around the V-pulley 1d.

Embodiment 9

Figure 9:
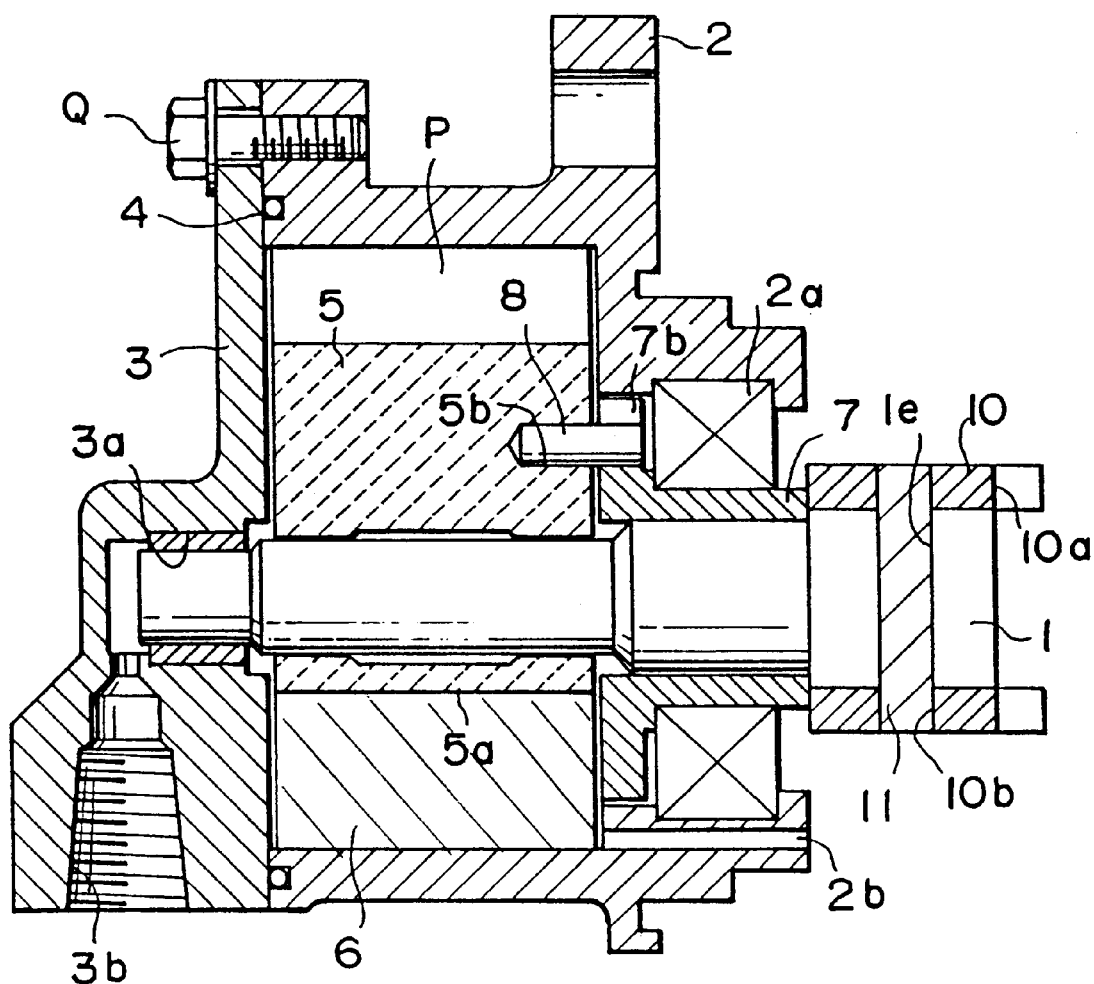
FIG. 9 is a side cross sectional view showing an embodiment 9 of the present invention.

FIG. 9 is a side cross sectional view showing an embodiment 9 of the present invention in which a coupling 10 is applied as the engaging unit with the engine side drive source, wherein arrangements similar to those mentioned above are denoted by the same numerals and the description thereof is omitted.

In this case, the cylindrical coupling 10 is mounted to the coupling-drive type input shaft 1 on one end thereof on the front side and the input shaft 1 is coupled with the engine side drive source through a projecting part (not shown) to be engaged with the recess 10a formed at the extreme end of the coupling 10.

The coupling 10 has an inside diameter slightly larger than the outside diameter of the input shaft 1 and a hole 1b which passes through both the sides thereof at its central portion in a diametrical direction.

Further, the input shaft 1 has a through hole 1e in a metrical direction formed to one end thereof on the front side which corresponds to the hole 10b of the coupling 10.

A locking pin 11 inserted into the hole 10b and the through hole 1e holds the input shaft 1 and the coupling 10 so that they are not relatively rotated.

What is claimed is:

1. A vane type vacuum pump, comprising:
   a cylindrical pump chamber of hermetically sealed structure having a suction port and an exhaust port;
   a rotor disposed in said pump chamber and having a rotary shaft offset with respect to a central axis of said pump chamber;
   a plurality of grooves disposed to the outer periphery of said rotor;
   vanes radially movably disposed in said grooves and sliding in intimate contact with the inner wall of said pump chamber when said rotor rotates;
   an input shaft having a rotary shaft coaxial with said rotor for rotating said rotor; and
   torque transmission means for transmitting the rotational torque of said input shaft to said rotor, wherein said torque transmission means comprising:
   a carrier disposed to the outer periphery of said input shaft integrally therewith;
   a flange unit formed to the end surface of said carrier so as to confront the end surface of said rotor;
   a plurality of recessed portions formed to the respective end surfaces of said rotor and said flange unit; and
   a plurality of pins for coupling said rotor with said flange unit through said respective recessed portions with said respective pins extending in the direction of the rotary shafts of said rotor and said input shaft and inserted into said respective recessed portions.

2. A vane type vacuum pump according to claim 1, wherein said respective pins are disposed concentrically with the center of rotation of said rotor and said input shaft.

3. A vane type vacuum pump according to claim 1, wherein said respective pins are securely fixed to the recessed portions on the end surface of said rotor by force-fit or shrinkage-fit as well as axially movably held by the recessed portions on the end surface of said flange unit.

4. A vane type vacuum pump according to claim 3, wherein the recessed portions on the end surface of said flange unit extends in a radial direction and is formed to a U-shape on a plane.

5. A vane type vacuum pump according to claim 3, wherein the recessed portions on the end surface of said flange unit have an inside diameter slightly larger than the outside diameter of said pins and are formed to a circular shape on a plane.

6. A vane type vacuum pump according to claim 1, wherein said respective pins are securely fixed to the recessed portions on the end surface of said flange unit by force-fit or shrinkage-fit as well as axially movably held by the recessed portions on the end surface of said rotor.

7. A vane type vacuum pump according to claim 6, wherein the recessed portions on the end surface of said rotor have an inside diameter slightly larger than the outside diameter of said pins and are formed to a circular shape on a plane.

8. A vane type vacuum pump according to claim 1, wherein said carrier is securely fixed to said input shaft by force-fit or shrinkage-fit.

9. A vane type vacuum pump according to claim 1, wherein said carrier is formed to the outer periphery of said input shaft integrally therewith.

10. A vane type vacuum pump according to claim 1, wherein said rotor has a through hole with an inside diameter slightly larger than the outside diameter of said input shaft and said input shaft is inserted into the through hole and journals said rotor so that it is movable in the direction of the rotary shaft thereof.

11. A vane type vacuum pump according to claim 1, wherein said rotor has a through hole with an inside diameter slightly smaller than the outside diameter of said input shaft and said input shaft supports said rotor by being force fit into the through hole.

12. A vane type vacuum pump according to claim 1, wherein said pump chamber is composed of a front bracket and a rear bracket each composed of aluminum alloy and said rotor is composed of aluminum alloy.

13. A vane type vacuum pump according to claim 12, wherein said rear bracket has an opening and one end of said input shaft is journaled by the opening.

14. A vane type vacuum pump according to claim 1, wherein said input shaft is journaled through the outer periphery of said carrier.

* * * * *